United States Patent [19]

Martel et al.

[11] Patent Number: 4,545,613
[45] Date of Patent: Oct. 8, 1985

[54] CAR SEAT CARRIER

[75] Inventors: Lisa Martel, Torrance, Calif.; Roy E. Knoedler; Donald L. Gerken, both of Columbus, Ind.

[73] Assignee: Cosco, Inc., Columbus, Ind.

[21] Appl. No.: 476,606

[22] Filed: Mar. 18, 1983

[51] Int. Cl.⁴ ............................................. A47D 1/10
[52] U.S. Cl. ................................... 297/250; 297/327
[58] Field of Search ............... 297/250, 253, 254, 327, 297/328, 329, 377; 248/188; 108/156

[56] References Cited

U.S. PATENT DOCUMENTS

| | | | |
|---|---|---|---|
| 3,454,304 | 7/1969 | Hudak | 297/253 X |
| 3,730,109 | 5/1973 | Kreizel et al. | 108/156 |
| 3,934,934 | 1/1976 | Farrell, Jr. et al. | 297/250 |
| 4,033,622 | 7/1977 | Boudreau | 297/250 |
| 4,231,612 | 11/1980 | Meeker | 297/250 |
| 4,306,749 | 12/1981 | Deloustal | 248/188 |
| 4,324,432 | 4/1982 | Eldon et al. | 297/377 |
| 4,348,048 | 9/1982 | Thevenot | 297/329 |
| 4,371,206 | 2/1983 | Johnson, Jr. | 297/377 |
| 4,394,563 | 7/1983 | Schnell | 248/188 |

Primary Examiner—Francis K. Zugel
Attorney, Agent, or Firm—Barnes & Thornburg

[57] ABSTRACT

An infant's vehicle chair includes a base with upwardly extending supports and a seat body pivotally coupled through the supports to the base. The seat body is constructed from molded plastic and includes channels housing a reinforcing tubular member which extends generally across the bottom of the seat, up the back of the seat, across the back of the seat, down the seat back, and along the bottom of the seat. The ends of the reinforcing tubular member are formed to provide two loops through which a vehicle seat belt is passed to secure the chair to a vehicle seat in a rearward-facing orientation.

9 Claims, 9 Drawing Figures

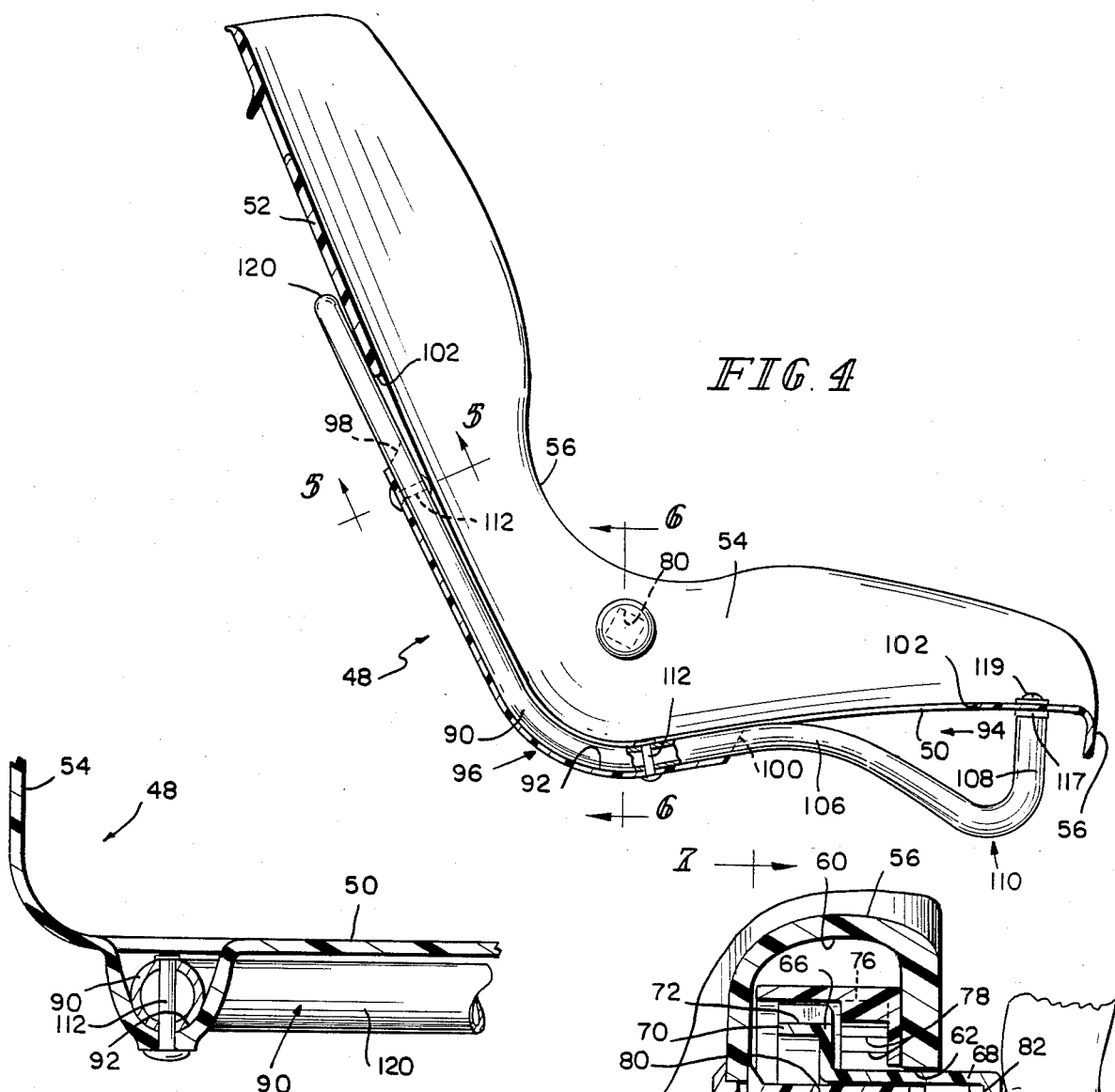

CAR SEAT CARRIER

This invention relates to chair construction. The invention is disclosed in the context of infant seats, and especially infant car seats.

A number of infant seat construction techniques are known. Typically, these techniques involve connection of a seat body to a carrying and/or reclining rest handle, so that the carrier/infant seat will hold the infant in a number of different sitting and reclining orientations. Examples are the infant's chair illustrated in U.S. Pat. No. 3,409,325 and the infant's chair or rocker illustrated in U.S. Pat. No. 3,804,459.

Infant and child car seats are also known. There are, for example, the car seats illustrated in the following U.S. Pat. Nos.: 4,231,612; 3,934,934; and 3,948,556.

According to one aspect of the invention, a chair includes a base providing an upwardly extending support, a seat body, and means for selectively pivotally coupling the seat body to the base. The means for selectively pivotally coupling the seat body to the base comprises a head, a pocket formed on one of the head and support and a tab formed on the other of the head and support for insertion into the pocket.

Illustratively, the selective pivotal coupling means comprises means defining a cavity in the head, the cavity including a side wall providing teeth or splines. The pocket is formed on the support and the tab is formed on the head. The tab includes means defining a tooth for engagement in the pocket The means for selectively pivotally coupling the seat body to the base further includes a hub providing a plurality of teeth or splines for selective engagement and disengagement with the teeth or splines of the cavity, and means for coupling the hub non-rotatably to the seat body, the hub and cavity being in substantial coaxial alignment, and means for yieldably urging the teeth or splines of the hub into engagement with the teeth or splines of the cavity. The means for pivotally coupling the hub non-rotatably to the seat body comprises means for providing a non-circular cross-section post on the hub and a complementary non-circular cross-section opening in the seat body.

According to another aspect of the invention, an infant's vehicle chair includes a base providing an upwardly extending support for resting on a vehicle seat, a seat body, and a means for selectively pivotally coupling the seat body to the base, the seat body including means defining a channel, and a reinforcing member extending through the channel to reinforce the seat body, a loop for engagement by a vehicle seat belt, and means for attaching the loop to the chair to anchor the chair to the vehicle seat.

Illustratively, the reinforcing member comprises a length of metal tube. The seat body includes a seat bottom and a seat back joined along adjacent regions thereof, and the length of metal tube is formed to extend rearward across the underside of the seat bottom, across the adjacent regions of the seat bottom and seat back and upward across the back side of the side back. The loop is provided at the end of the length of metal tube adjacent the front of the seat bottom. The length of metal tube includes a bight portion which extends across the back side of the seat back and a further portion which extends downward across the back side of the seat back, across the adjacent regions of the seat bottom and seat back, and forward across the underside of the seat bottom.

Additionally, according to an illustrative embodiment, the further portion terminates in a second loop adjacent the front of the seat bottom. Means are provided for attaching the terminations of the length of metal tube to the seat bottom. The attachment means comprise tube end plugs and screws threaded through the seat bottom adjacent its front and into the tube end plugs. The channel is generally U-shaped in cross section, is closed when viewed from the underside of the seat bottom and back side of the seat back, and is open when viewed from the top side of the seat bottom and front side of the seat back. The channel is provided adjacent one side of the seat bottom and seat back and a second similarly configured channel is provided adjacent the other side of the seat bottom. The second channel is generally U-shaped in cross section, is closed when viewed from the underside of the seat bottom and back side of the seat back, and is open when viewed from the top side of the seat bottom and front side of the seat back. The seat bottom and seat back each include means defining a slot which extends away from the end of the channel to aid in positioning the reinforcing member in the channel.

The invention may best be understood by referring to the following description and accompanying drawings which illustrate the invention. In the drawings:

FIG. 4 is a sectional view of the seat portion only of the combination seat and carrier of FIG. 1, taken generally along section lines 2, 4—2, 4 thereof;

FIG. 5 is a fragmentary sectional view of the seat portion of FIG. 4, taken generally along section lines 5—5 thereof;

FIG. 6 is a fragmentary sectional view of a pivot joint portion of the combination seat and carrier of FIGS. 1 and 4 taken generally along section lines 6—6 thereof;

Figure 1:
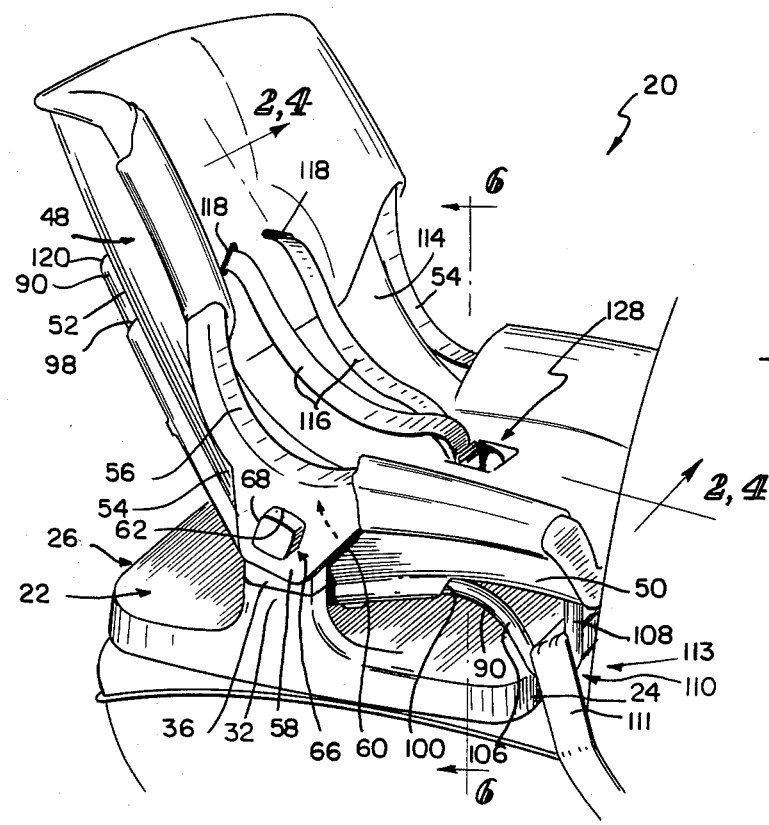
FIG. 1 is a perspective view of a combination infant car seat and carrier constructed according to the present invention attached by a seat belt to a vehicle seat in rearward facing orientation.

Referring particularly to FIGS. 1-2 and 6-8, a combination infant car seat and carrier 20 constructed according to the present invention includes a base 22 molded from high-impact plastic material, and having a front edge 24, a rear edge 26, and side edges 28, 30. Supports 32, 34 project upwardly from side edges 28, 30, respectively. Supports 32, 34 are integrally and unitarily formed with the base 22. Supports 32, 34 are provided with snap-fitted support heads 36, 38, respectively. Support heads 36, 38 engage supports 32, 34, and, thereby, the base 22 in a manner which will be described. Each support head 36, 38 includes a generally right circular cylindrical top portion 40 defining a cavity 42 which is open on one side 44 and closed on the other side 46.

Chair 20 further includes a seat body 48. Seat body 48 includes a seat bottom portion 50, a seat back portion 52, and seat side portions 54 provided along the seat body 48 lateral edges. The seat body 48 is provided with a contoured surrounding lip 56 which, along seat side portions 54, extends downwardly forming two ears 58. The ears 58 cooperate with the seat side portions 54 to define a forwardly, rearwardly, and downwardly opening channel or pocket 60 along each of the seat body 48 sides. The support heads 36, 38 are accommodated within these channels or pockets 60 in the assembled chair 20.

The ears 58 are provided with generally square cross-section openings 62 (FIGS. 7 and 8) which are in alignment with each other and form an axis 64 about which the body 48 is pivotally mounted to the base 22. A pair of hubs 66 are provided, each of which includes a post 68 having a generally square cross section to be movable generally along the axis 64 within a respective opening 62. Each hub 66 also includes a generally right circular cylindrical portion 70 having an outside surface 72 providing a plurality of radially projecting teeth 74. A corresponding generally right circular cylindrical inner wall 76 of each cavity 42 is provided with a plurality of complementarily interfitting radially projecting teeth 78.

Each seat side portion 54 is provided with a generally square cross-section post 80, which is formed as a separate element from the seat body 48, but which is substantially permanently attached to a respective seat side portion 54, e.g., by an acrylic adhesive. Each hub 66 is provided with a complementarily configured generally square cross-section well 82. Springs 84 are positioned within the wells 82 and are captured therein by the closed ends 86 of posts 80. The seat body 48 is thus pivotally mounted about axis 64 to the base 22. The seat body 48 is selectively movable to any one of a number of positions between the upright position and reclining position by depression of posts 68 sufficiently to disengage teeth 74 from their respective complementary teeth 78, followed by rotation of the seat body 48 about axis 64 to a desired position and releasing of pressure on posts 68. This permits teeth 74 to re-engage teeth 78, by virtue of the urging force of springs 84.

The seat body 48 structure is reinforced by a tubular metal frame 90 (FIGS. 2 and 4–6) which is somewhat U-shaped when viewed from the front or back of the chair. The seat bottom portion 50 and seat back portion 52 are provided with a pair of transversely spaced channels 92 which are open from the front 94 of the seat body portion 48, but are closed when viewed from the rear 96 of seat body portion 48. The channels are provided with openings 98 at their upper ends on the seat back portion 52, and with openings 100 on their ends provided on the seat bottom portion 50. Slots 102 adjacent openings 98, 100 permit assembly of the reinforcing tubular metal frame 90 into the channels 92.

The tubular metal frame 90 follows generally the contour of the seat back portion 52 and seat bottom portion 50, but at the slots 102 adjacent openings 100, the tubular metal frame 90 ends extend away from the seat bottom portion 50 at 106 and then back toward the seat bottom portion 50 at 108 to form loops or hooks 110 for engaging the seat belt 111 associated with a vehicle seat 113 when the infant seat or carrier 20 is positioned in rearward-facing orientation on the seat 113, as best illustrated in FIG. 1. The ends of frame 90 are fitted with tube end plugs 117 which are attached to the seat bottom portion 50 by screws 119 threaded through the seat bottom 50 and plugs 117. Rivets 112 applied through the walls of channels 92 fix the reinforcing tubular metal frame 90 to the seat body portion 48. A urethane padded vinyl cushion 114 is then riveted or otherwise attached to the seat body portion 48 to provide comfort for the infant to be retained within the chain 20.

Figure 3:
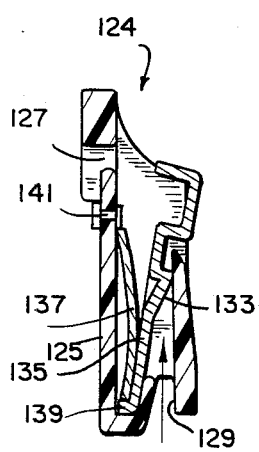
FIG. 3 is an enlarged vertical sectional view through the shoulder harness restraint buckle of the combination seat and carrier of FIGS. 1 and 2.
Figure 2:
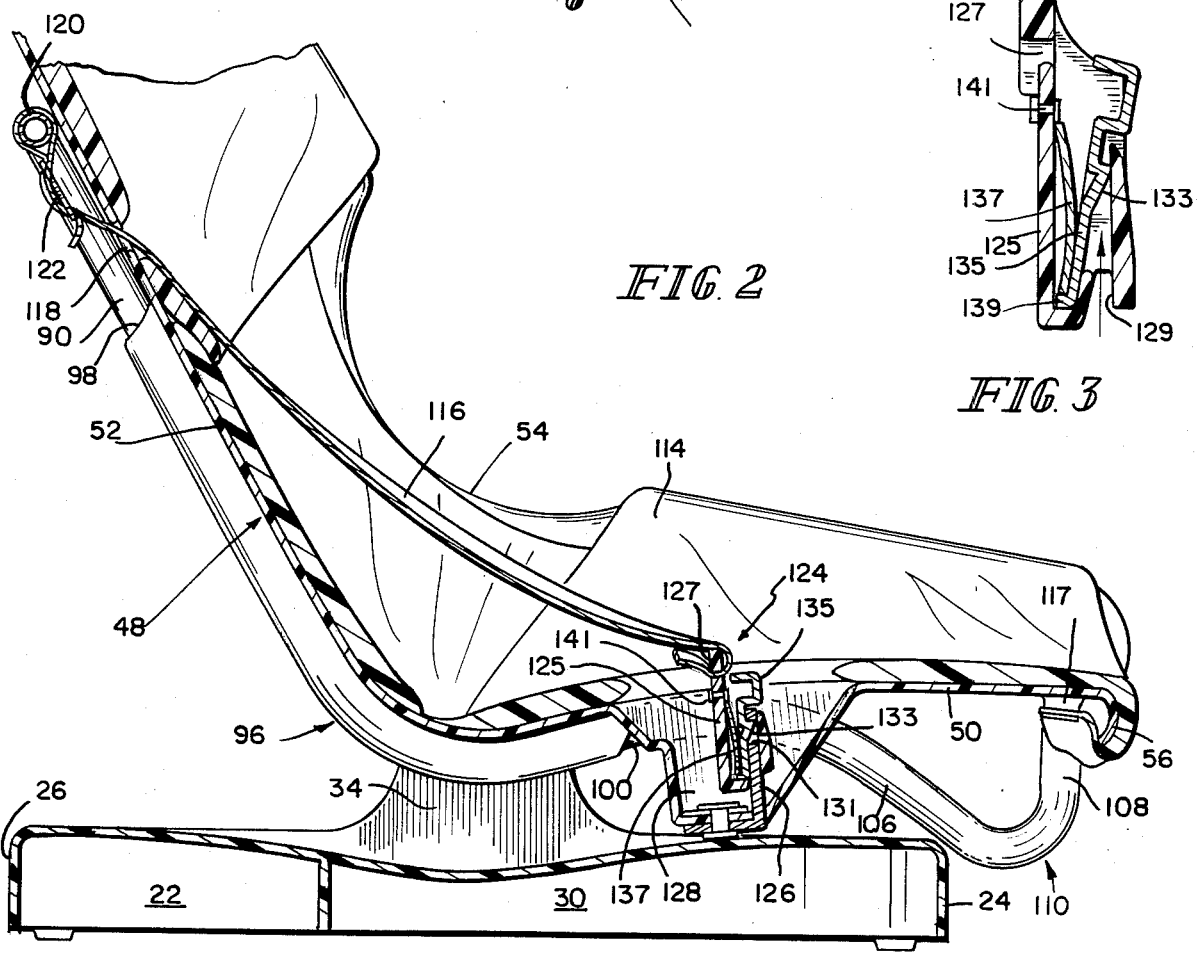
FIG. 2 is a sectional view of the combination infant car seat and carrier of FIG. 1, taken generally along section lines 2, 4—2, 4 thereof.

An infant-restraining shoulder harness 116 is anchored at its ends through slots 118 provided in the seat back portion 52 to the transverse bight 120 at the upper end of the tubular metal frame 90 by means of buckles 122 which permit adjustment of the harness 116 to accommodate infants of different sizes. A safety buckle 124 at the lower end of the harness 116 is engageable with an upstanding metal fastener 126 provided in a well 128 in the seat bottom portion 50. Placement of the fastener 126 in the well 128 keeps the fasteners 126 out of the way. The fastener 126 is riveted into the bottom of the well 128. The construction of the buckle 124 is best illustrated in FIGS. 2 and 3. It includes a housing 125 constructed from a high-impact plastic and having a molded loop 127 for engagement by the harness 116. An opening 129 is provided in the end of housing 125 opposite loop 127 to accept the end of fastener 126. Fastener 126 is provided with an opening 131 for engagement by a boss 133 formed on a metal clasp member 135 movably positioned in housing 125 and urged by metal leaf spring 137 to a fastener 126-engaging orientation. Spring 137 is captured in housing 125 between a lip 139 formed at the inner end of clasp member 135 and the head of a rivet 141 through a wall of the housing 125.

Figure 7:
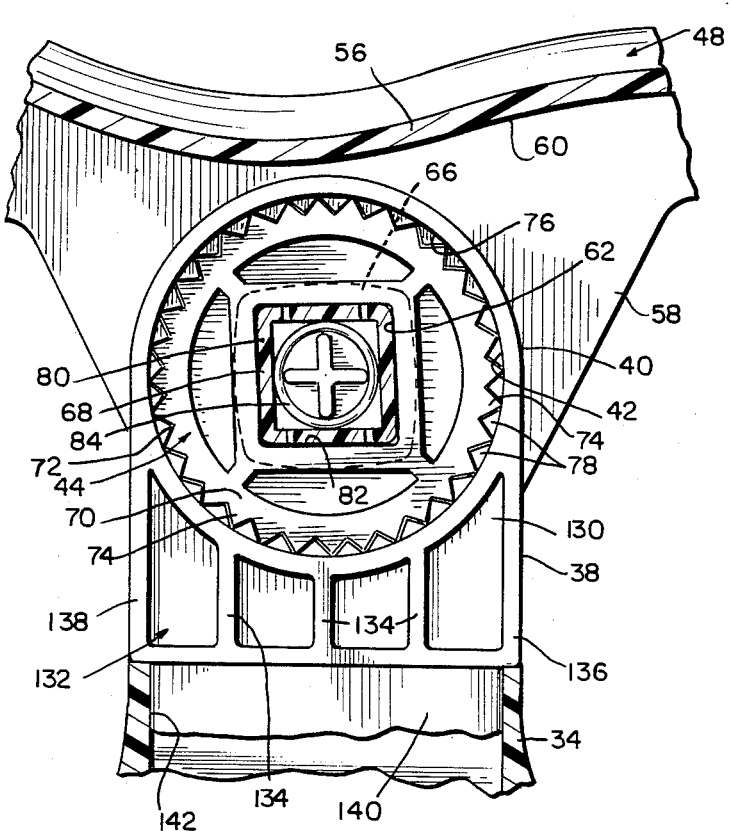
FIG. 7 is a fragmentary sectional view of the pivot joint of FIG. 6 taken generally along section lines 7—7 thereof.
Figure 8:
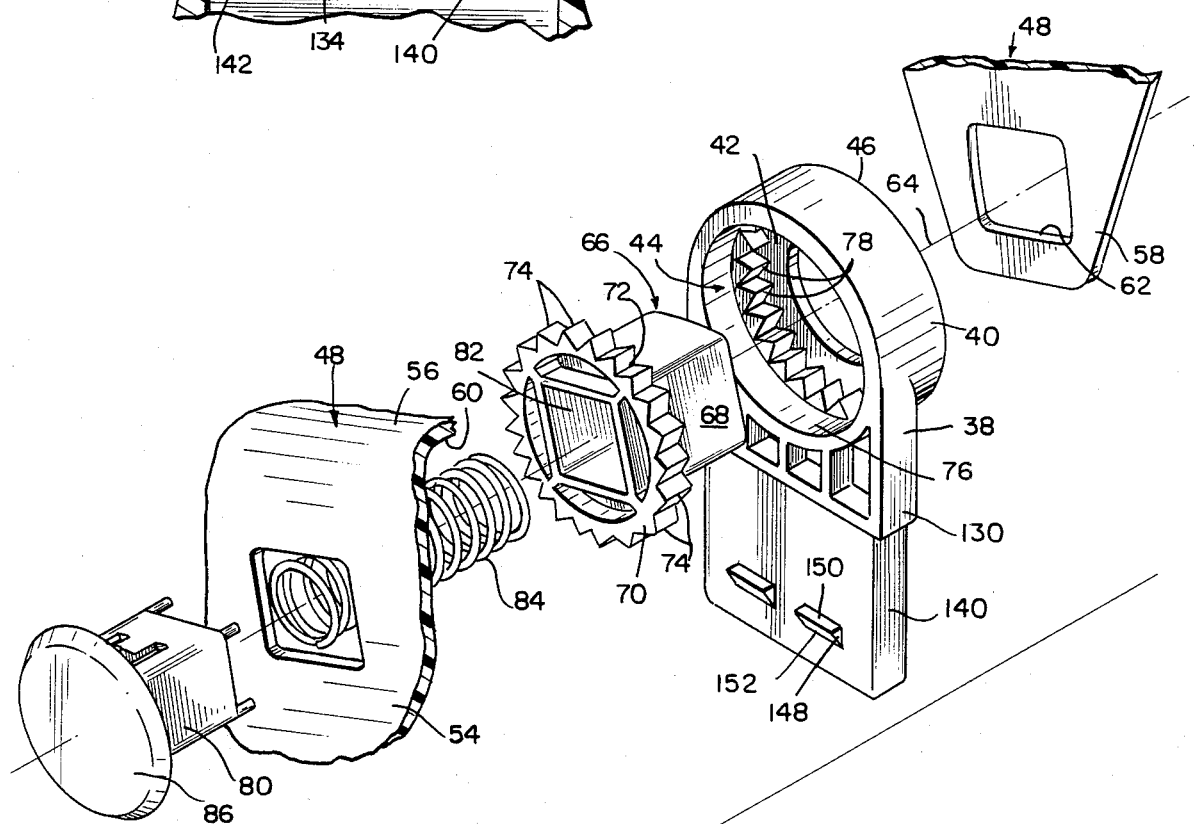
FIG. 8 is an exploded perspective view of the pivot joint of FIGS. 6 and 7.
Figure 9:
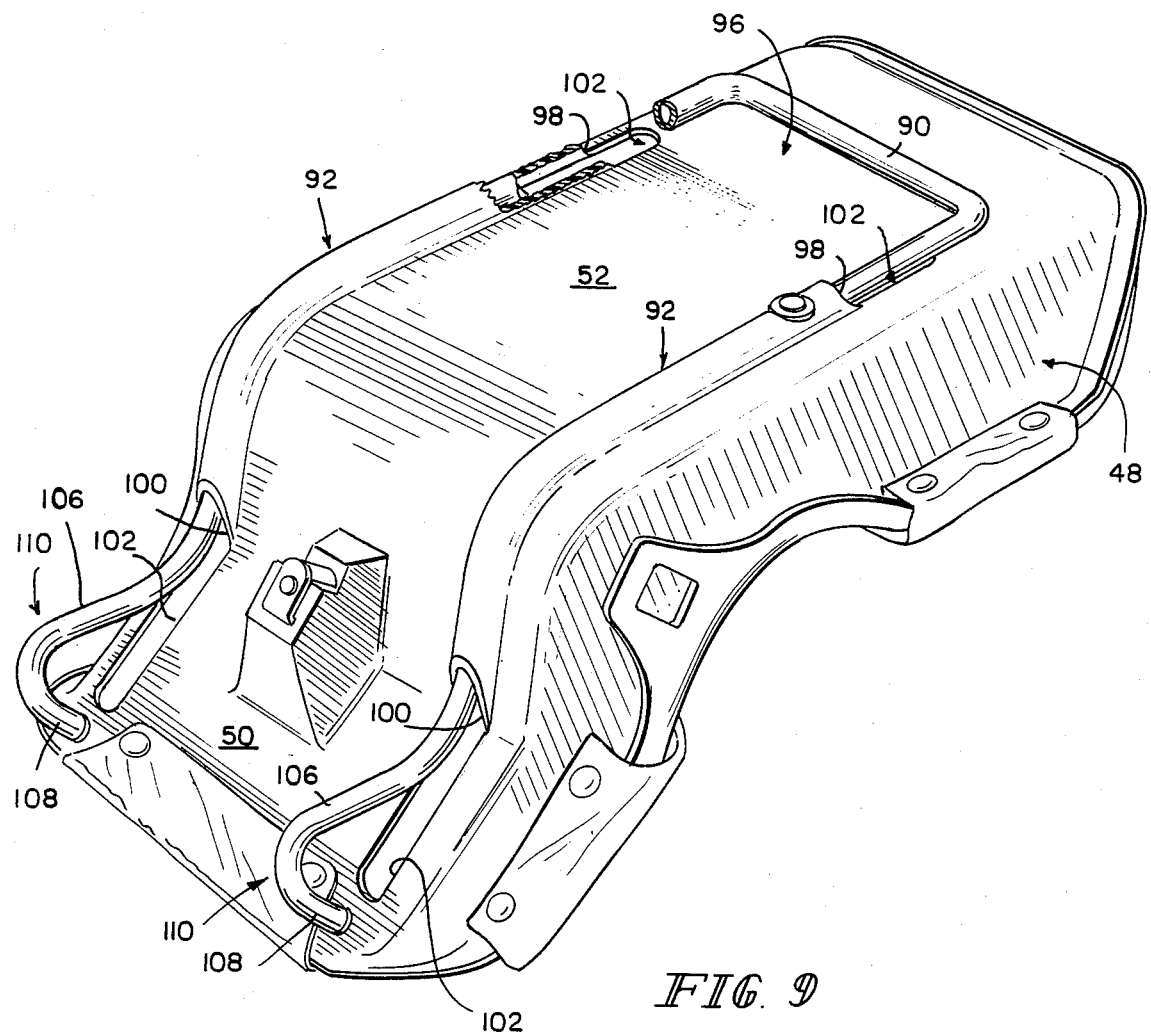
FIG. 9 is a perspective back view of the combination infant car seat and carrier constructed according to the present invention.

Turning now to the specific construction of the support heads 36, 38 and their engagement with the supports 32, 34, each head 36, 38 includes a body portion 130 extending downwardly from its respective right circular cylindrical portion 40 (FIGS. 6–8). The body portions 130 are open on their sides 132 facing the seat side portions 54. The body portions 130 are provided with a number of reinforcing ribs or webs 134. Illustratively, there are three such ribs which, in addition to the front and rear walls 136, 138, respectively, of the body portion 130, provide the necessary strength for the support heads 36, 38. Each body portion 130 further includes a tab 140 for insertion into a respective upwardly opening pocket 142 formed in its respective support 32, 34. The central reinforcing rib 134 of each body portion 130 extends downward, along with the front and rear walls 136, 138 to the bottom 144 of its respective tab 140. Each tab 140 is provided with a generally smooth, continuous inner side wall 146 which is provided with a pair of outwardly projecting teeth 148 adjacent its lower end. Teeth 148 are provided with flat upwardly facing surfaces 150 and downwardly and inwardly facing surfaces 152 angled at, illustratively, 30° to vertical.

A pocket or opening 154 is formed in the top of each support 32, 34 on base 22. The openings 154 extend vertically entirely through the base 22 and accommodate the tabs 140 of support heads 36, 38. The interior walls 156 of pockets 154 are provided with reinforcing ribs 158 which make the tabs 140 a tight sliding fit into pockets 154. The reinforcing ribs 158 on the inner walls 156 of pockets 154 terminate at 160 to accomodate the teeth 148 on the inner side walls 146 of tabs 140. A bonding agent, such as styrene solvent, is applied to the outer side walls of tabs 140 after the tabs 140 are inserted into pockets 154. During the insertion, teeth 148 cause the interior walls 156 of pockets 154 to be deflected outwardly slightly to pass the tabs 140 with their teeth 148. When the teeth 148 reach the bottoms 160 of ribs 158, the interior walls 156 of pockets 154 return to their undeflected orientations, and the styrene hardens, securing the heads 36, 38 on the supports 32, 34, respectively.

What is claimed is:

1. An infant's vehicle chair comprising a base including means for providing an upwardly extending support for resting on the vehicle seat, a seat body, and means for selectively pivotally coupling the seat body to the base, the seat body formed with integral channels which are generally U-shaped in cross section, the channels being closed when viewed from the underside of the seat bottom and back side of the seat back and open when viewed from the top side of the seat bottom and front side of the seat back, the seat body including slots adjacent upper and lower ends of the channels, and a reinforcing member extending in the channels to reinforce the seat body and having portions extending through the slots and with one portion extending along a portion of the back side of the seat, a loop for engagement by a vehicle seat belt, and means for attaching the loop to the chair to anchor the chair to the vehicle seat.

2. The invention of claim 1 wherein the reinforcing member comprises a length of metal tube.

3. The invention of claim 2 wherein the seat body includes a seat bottom and a seat back, the length of metal tube is formed to extend rearward along the underside of the seat bottom and upward along the back side of the seat back.

4. The invention of claim 3 wherein the loop is provided at the end of the length of metal tube adjacent the front of the seat bottom.

5. The invention of claim 4 wherein the length of metal tube includes a bight portion which extends across the back side of the seat back and a further portion which extends downward along the back side of the seat back and forward along the underside of the seat bottom.

6. The invention of claim 5 wherein the further portion terminates in a second loop adjacent the front of the seat bottom.

7. The invention of claim 6 and further including means for attaching the terminations of the length of metal tube to the seat bottom.

8. The invention of claim 7 wherein the attachment means comprise tube end plugs and screws threaded through the seat bottom adjacent its front and into the tube end plugs.

9. The invention of claim 1 wherein a channel is provided adjacent one side of the seat bottom and seat back and a second similarly configured channel is provided adjacent the other side of the seat bottom.

* * * * *